US007027678B2

(12) United States Patent
Campbell et al.

(10) Patent No.: US 7,027,678 B2

(45) Date of Patent: Apr. 11, 2006

(54) METHOD FOR CONTROLLING THE FREQUENCY DEPENDENCE OF INSERTION LOSS IN AN OPTICAL ASSEMBLY

(75) Inventors: Scott P. Campbell, Thousand Oaks, CA (US); Ian McMichael, Port Hueneme, CA (US)

(73) Assignee: Oplink Communications, Inc., Fremont, CA (US)

(*) Notice: Subject to any disclaimer, the term of this patent is extended or adjusted under 35 U.S.C. 154(b) by 159 days.

(21) Appl. No.: 10/741,053

(22) Filed: Dec. 19, 2003

(65) Prior Publication Data

US 2004/0136641 A1 Jul. 15, 2004

Related U.S. Application Data

(60) Provisional application No. 60/437,193, filed on Dec. 31, 2002, provisional application No. 60/437,195, filed on Dec. 31, 2002.

(51) Int. Cl.
*G02B 6/42* (2006.01)
*G02B 6/26* (2006.01)

(52) U.S. Cl. ........................ 385/15; 359/237; 359/238; 359/240; 359/245; 359/260

(58) Field of Classification Search .................. 385/15
See application file for complete search history.

(56) References Cited

U.S. PATENT DOCUMENTS 6,584,249 B1 * 6/2003 Gu et al. ...................... 385/47
6,809,865 B1 * 10/2004 Chen .......................... 359/578

* cited by examiner

*Primary Examiner*—Frank G. Font
*Assistant Examiner*—Derek L. Dupuis
(74) *Attorney, Agent, or Firm*—Scot A. Reader, Esq.

(57) ABSTRACT

A method for controlling the frequency dependence of insertion loss in an etalon-lens-fiber (ELF) optical assembly comprises defining target frequencies and insertion loss objectives therefor and adjusting the optical path length between pairs of the etalon, lens and fiber components until insertion loss objectives are achieved. Insertion loss objectives include insertion loss and insertion loss ripple objectives. The method allows for control of the frequency dependence of insertion loss and insertion loss ripple without introducing additional components, such as spectral filters, into the system.

6 Claims, 3 Drawing Sheets

Figure 4 $(z = z_1)$
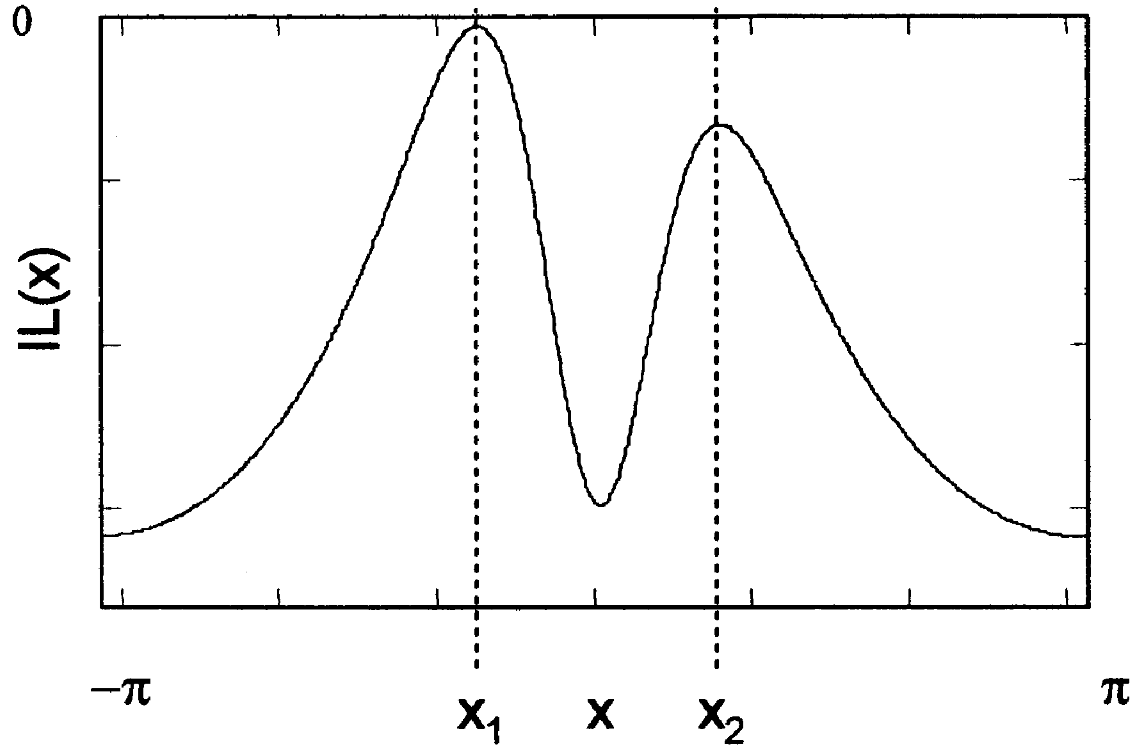
Figure 5
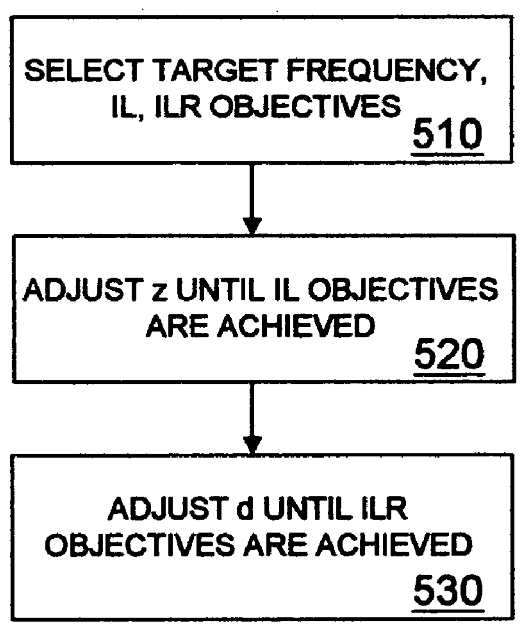

METHOD FOR CONTROLLING THE FREQUENCY DEPENDENCE OF INSERTION LOSS IN AN OPTICAL ASSEMBLY

CROSS-REFERENCE TO RELATED APPLICATIONS

This application claims the benefit of U.S. provisional application No. 60/437,193, filed on Dec. 31, 2002, the contents of which are incorporated herein by reference. This application has subject matter related to U.S. provisional application No. 60/437,195, filed on Dec. 31, 2002, the contents of which are incorporated herein by reference.

BACKGROUND OF INVENTION

Etalon-lens-fiber (ELF) optical assemblies have many practical applications. One is to impose a group delay on the wavelength components of light to correct group velocity dispersion (GVD) previously induced on the light's pulses by a high speed, long haul, Dense Wave Division Multiplexing (DWDM) transmission system. For example, an etalon typically has a first mirror that is partially reflective, a second mirror that is fully reflective and a glass cavity in between. The spacing between the mirrors (i.e. the thickness of the glass cavity) is generally a function of the channel spacing of a DWDM system in which the optical assembly is operative. Light arriving from a lens enters and exits the etalon through the partially reflective mirror. The etalon subjects different wavelength components, i.e. different frequencies, of the light to variable delay. That is, the partial reflectivity of the first mirror causes certain wavelength components to be restrained in the glass cavity between the first mirror and the second mirror longer than others, with the wavelength components restrained the longest said to be at resonant frequencies. The etalon thereby imposes a group delay on the wavelength components of the light which can correct group velocity dispersion previously induced on the light's pulses by a high speed, long haul, DWDM transmission system.

One technical challenge presented by using ELF and similar optical assemblies in practical applications is how to address the frequency dependence of the insertion loss and insertion loss ripple of such assemblies. Because different wavelength components of light incident to etalons bounce between the front and back mirrors a different number of times prior to transmittance, light reflected from etalons exhibits a frequency-dependent spatial shift and a phase curvature. As a result of this shift and curvature, certain frequencies of light outbound from the etalon transmit on the outbound fiber more efficiently than others. This difference in transmission efficiency among frequencies is evident in frequency-dependent insertion loss and insertion loss ripple profiles.

Previous solutions have attempted to control the frequency dependence of the insertion loss and insertion loss ripple inherent in ELF and similar optical assemblies by introducing spectral filters into the system. However, there are disadvantages to this approach. First, spectral filters increase the insertion loss of the system by the average loss of the spectral filter. Second, spectral filters have typically only been able to make modifications to insertion loss that are slowly varying with frequency.

SUMMARY OF THE INVENTION

In one aspect, the present invention provides a method for controlling the frequency dependence of insertion loss in a optical assembly of a type that includes an etalon and a spatial filter coupled on an optical path, comprising: defining one or more target frequencies and an insertion loss objective; and adjusting the optical path length between the etalon and the spatial filter until an insertion loss at the target frequencies conforms with the insertion loss objective. In a preferred embodiment, the spatial filter comprises a lens and a fiber, and the adjusted optical path length is an optical path length between the etalon and the lens.

In another aspect, the present invention provides a method for controlling the frequency dependence of insertion loss ripple in an optical assembly of a type including an etalon, a lens and a fiber coupled on an optical path, comprising: defining one or more target frequencies and an insertion loss ripple objective; and adjusting the optical path length between the lens and the fiber until an insertion loss ripple at the target frequencies conforms with the insertion loss ripple objective.

In another aspect, the present invention provides an optical assembly, comprising: an etalon; a spatial filter; and an optical path coupling the etalon and the spatial filter, wherein the length of the optical path is selected to achieve a predetermined insertion loss objective. In a preferred embodiment, the spatial filter comprises a lens and a fiber, and the selected optical path length is an optical path length between the etalon and the lens.

In yet another aspect, the present invention provides an optical assembly, comprising: an etalon; a lens; a fiber; and an optical path coupling the etalon, the lens and the fiber, wherein the length of a segment of the optical path between the lens and the fiber is selected to achieve a predetermined insertion loss ripple objective.

These and other aspects of the invention will be better understood by reference to the following detailed description, taken in conjunction with the accompanying drawings that are briefly described below. Of course, the actual scope of the invention is defined by the appended claims.

BRIEF DESCRIPTION OF THE DRAWINGS

FIG. 4 is a graph illustrating insertion loss as a function of frequency wherein insertion loss is minimized at frequencies shifted with respect to a frequency half-way between resonances, and also illustrating insertion loss ripple due to phase curvature.

FIG. 5 is a flow diagram illustrating a method for controlling the frequency dependence of insertion loss and insertion loss ripple in a preferred embodiment of the invention.

DETAILED DESCRIPTION OF THE PREFERRED EMBODIMENT

Figure 1:
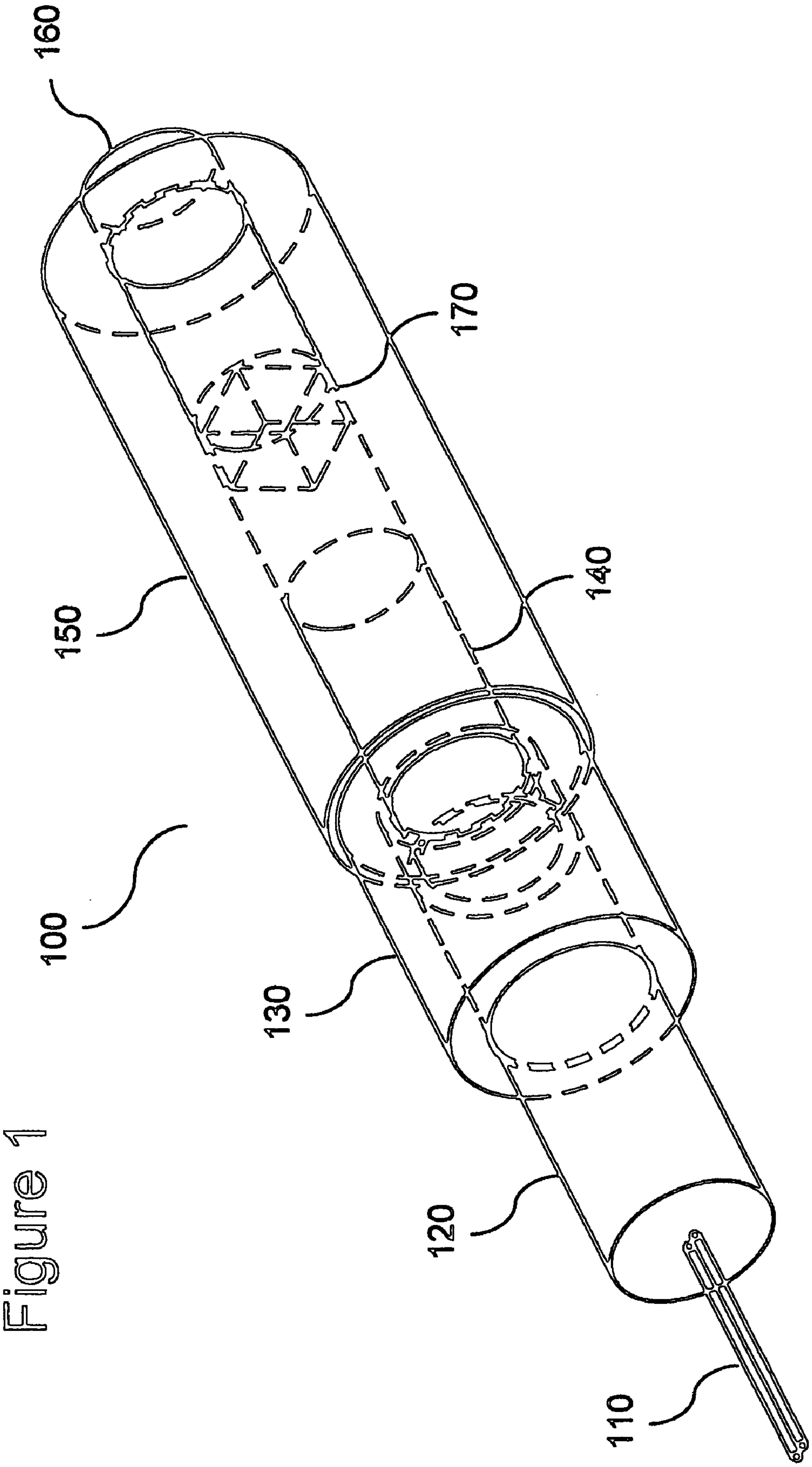
FIG. 1 is a perspective view of an ELF optical assembly in a preferred embodiment of the invention.

In FIG. 1, a perspective view of an ELF optical assembly 100 is shown in a preferred embodiment. Optical assembly 100 includes optical fibers 110 housed within a pigtail 120, which is in turn housed within a pigtail sleeve 130. Pigtail sleeve 130 is coupled to a lens sleeve 150 in which is housed a lens 140 and a rod 160. Mounted on rod 160 is an etalon 170, such as a Gires-Tournois etalon (GTE). Components 110 through 160 are preferably made of glass, although other material compositions are possible.

Figure 2:
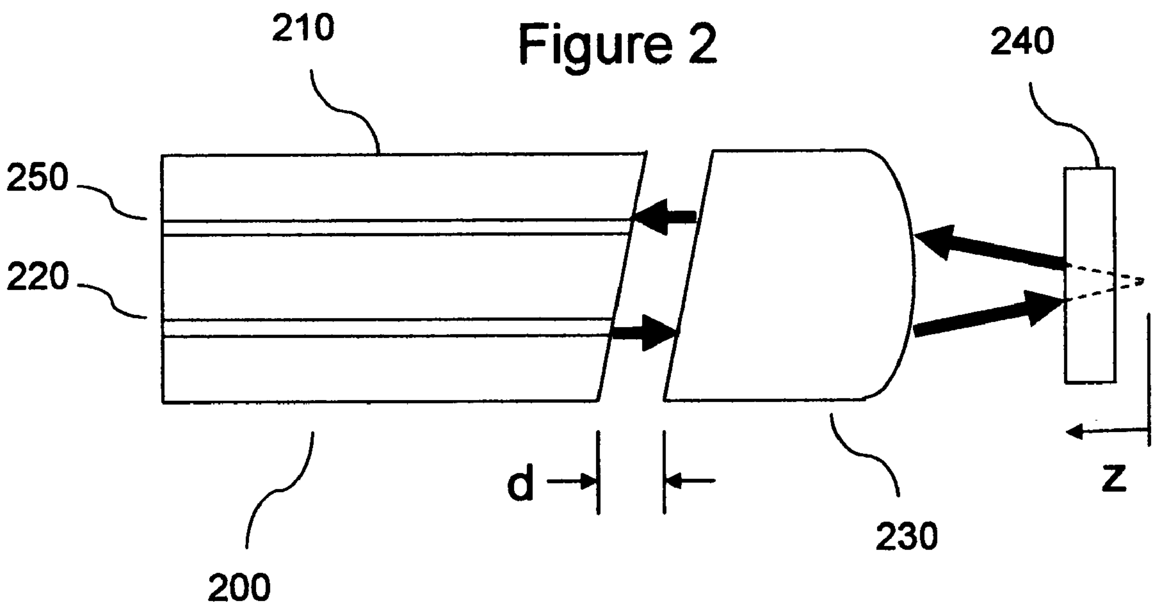
FIG. 2 is a cross-sectional view of an ELF optical assembly and an optical path therethrough in a preferred embodiment of the invention.

Turning now to FIG. 2, a cross-sectional view of an ELF optical assembly 200 and an optical path therethrough are shown in a preferred embodiment. In operation, inbound light enters optical assembly 200 on one of fibers 220, travels through pigtail 210 on the one of fibers 220 and is emitted from the one of fibers 220 into free space between pigtail 210 and lens 230. The light reaches lens 230 where it is subjected to angular and focal adjustments prior to being emitted from lens 230 into free space between lens 230 and etalon 240. The light reaches etalon 240 where a desired frequency-dependent delay is induced on the light prior to reflecting the light back through lens 230 and into the other one of fibers 250.

Lens 230 and fiber 250 together form a single mode spatial filter. Spatial filters other than a lens-fiber spatial filter may be used in other embodiments of the invention. For example, fiber 250 may be replaced with a pinhole (simply a small hole, about the same diameter as the core of the fiber that transmits the light, in a piece of opaque material, usually a metal foil). In that event, a lens-pinhole filter would be operative as a single mode spatial filter.

For inducing the desired frequency-dependent delay, etalon 240 has a first mirror that is partially reflective, a second mirror that is fully reflective and a glass cavity in between. Light arriving from lens 230 enters and exits etalon 240 through the partially reflective mirror. Etalon 240 subjects different wavelength components of the light to variable delay in accordance with its resonant properties. That is, the partial reflectivity of the first mirror causes certain wavelength components to be restrained in the glass cavity between the first mirror and the second mirror longer than others.

Attendant to inducing the desired frequency-dependent delay, etalon 240 produces side effects that can adversely impact on transmission efficiency. A first side effect is insertion loss due to spatial separation of the light. Particularly, the delay induced by etalon 240 on the incident light results from the light bouncing between the front mirror and the back mirror prior to transmittance. Since the light is incident into etalon 240 at an angle, the light follows a zig-zag path up etalon 240 as it bounces back and forth. This results in spatial separation of the reflected light from the incident light. Moreover, since different wavelength components of the light experience a different number of bounces, the amount of spatial separation of the reflected light from the incident light is different for different wavelength components. That is, the wavelength components of the reflected light are spatially separated not just from the incident light, but also from one another. As a result of this frequency-dependent spatial separation, lens 230, which acts as a spatial filter, couples certain wavelength components of the light to outbound fiber 250 more efficiently than others.

A second side effect produced by etalon 240 is insertion loss ripple due to phase curvature of the light. Different wavelength components of the incident light experience different degrees of phase curvature in etalon 240. Particularly, wavelength components approaching the resonant frequency acquire a converging phase curvature, whereas wavelength components beyond the resonant frequency obtain a diverging phase curvature.

These side effects are advantageously treated by regulating the distance variables z and d illustrated in FIG. 2. The front mirror of etalon 240 is positioned at a distance z from a nominal position of z=0. The nominal position of z=0 is the position at which the front mirror of etalon 240, if replaced with a fully reflective mirror, would be placed to minimize insertion loss. In a preferred embodiment, the distance z is advantageously adjusted (thereby adjusting the optical path length between lens 230 and etalon 240) to modify the transmission efficiency at one or more target frequencies and thereby achieve an insertion loss objective for the one or more target frequencies. Moreover, lens 230 and outbound fiber 250 are separated by a distance d. In a preferred embodiment, the distance d is advantageously adjusted (thereby adjusting the optical path length between lens 230 and fiber 250) to modify phase curvature at one or more target frequencies and thereby achieve an insertion loss ripple objective for the one or more target frequencies.

Figure 3:
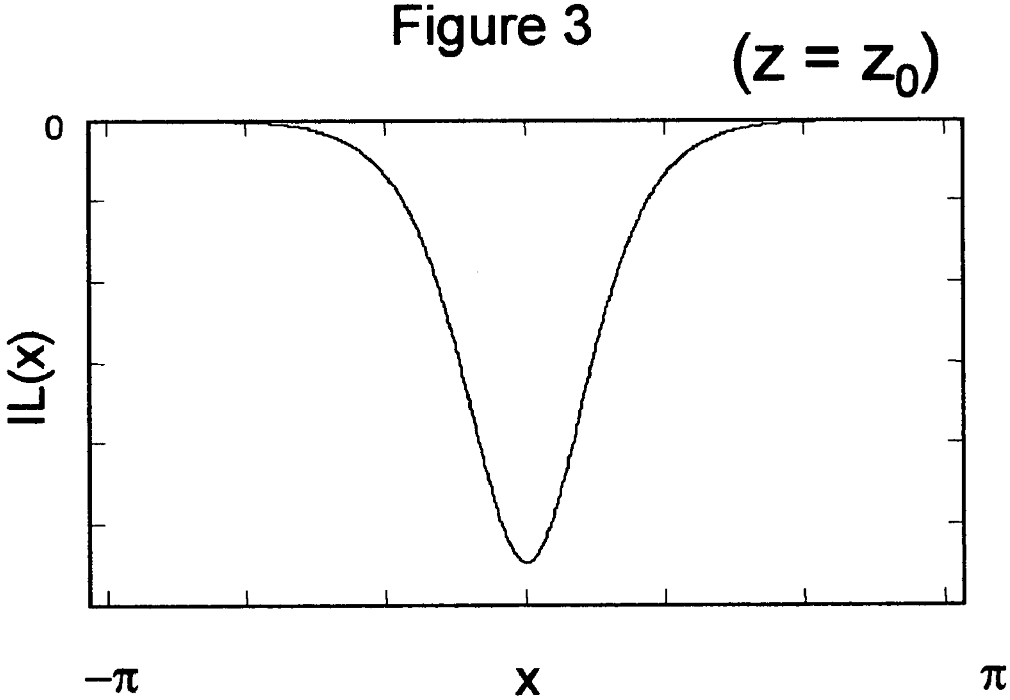
FIG. 3 is a graph illustrating insertion loss as a function of frequency wherein insertion loss is minimized at a frequency half-way between resonances.

Turning now to FIGS. 3 and 4, a method for controlling insertion loss and insertion loss ripple in optical assembly 200 is described in more detail with the help of illustrations. In FIGS. 3 and 4, the resonant frequency of etalon 240 is represented by x, with the half-way frequency between resonances represented by −n and n, respectively.

Referring first to FIG. 3, an insertion loss and insertion loss ripple profile at an initial z-distance $z_0$ is illustrated. As can be seen, at the initial distance $z_0$, insertion loss is at a maximum at the resonant frequency and is at a minimum at the half-way frequency between resonances.

Now assume that it is desired for a particular application to minimize insertion loss not at the half-way frequency between resonances, but rather at two target frequencies $x_1$ and $x_2$ that are shifted with respect to the half-way frequency. Referring to FIG. 4, this desired insertion loss profile may be achieved by adjusting the z-distance from the initial distance $z_0$ to a second distance $z_1$. As can be seen, at the second distance $z_1$, insertion loss is no longer minimized at the half-way point between resonances, but rather at target frequencies $x_1$ and $x_2$.

Note, however, that in FIG. 4 the insertion loss experienced at target frequency $x_2$ is slightly greater than that at target frequency $x_1$. This disparity demonstrates the effect on transmission efficiency of the phase curvature introduced by etalon 240. Particularly, the converging phase curvature frequency (e.g. $x_1$) couples better into fiber 250 than the diverging curvature frequency (e.g. $x_2$), resulting in a larger insertion loss ripple than would be observed in the absence of phase curvature effects (where the two peaks would be substantially equal). These phase curvature effects may be advantageously reduced by increasing, through adjustment, the distance d between lens 230 and fiber 250.

Distance variables z and d may be adjusted and selected, and the optical assembly thereafter fixedly assembled, in the manner described, for example, in U.S. provisional application No. 60/437,195, commonly assigned to the assignee hereof, and incorporated herein by reference.

Turning finally to FIG. 5, a flow diagram illustrates a preferred method for controlling the frequency dependence of insertion loss and insertion loss ripple in an ELF optical assembly. At Step 510, one or more target frequencies are selected, along with insertion loss (IL) and insertion loss ripple (ILR) objectives for the target frequencies. At Step 520, the distance z is adjusted to change the optical path length between the lens and the etalon until conformance with the IL objectives is achieved. The conforming z-distance is selected. Finally, at Step 530, the distance d is adjusted to change the optical path length between the lens and the fiber until conformance with the ILR objectives is achieved. The conforming d-distance is selected.

It will be appreciated by those of ordinary skill in the art that the invention may be embodied in other specific forms without departing from the spirit or essential character hereof. The present invention is therefore considered in all respects to be illustrative and not restrictive. The scope of the invention is indicated by the appended claims, and all changes that come with in the meaning and range of equivalents thereof are intended to be embraced therein.

We claim:

1. A method for controlling the frequency dependence of insertion loss in an optical assembly of the type that includes an etalon, a lens and a fiber coupled on an optical path, comprising the steps of:

defining one or more target frequencies, a minimum insertion loss and a minimum insertion loss ripple;

adjusting the optical path length between the etalon and the lens until an insertion loss at the target frequencies conforms with the minimum insertion loss; and adjusting the optical path length between the lens and the fiber until an insertion loss ripple at the target frequencies conforms with the minimum insertion loss ripple.

2. A method for controlling the frequency dependence of insertion loss ripple in an optical assembly of the type including an etalon, a lens and a fiber coupled on an optical path, comprising the steps of:

defining one or more target frequencies and a minimum insertion loss ripple; and adjusting the optical path length between the lens and the fiber until an insertion loss ripple at the target frequencies conforms with the minimum insertion loss ripple.

3. The method of claim 2, further comprising the steps of:

defining a minimum insertion loss; and adjusting the optical path length between the etalon and the lens until an insertion loss at the target frequencies conforms with the minimum insertion loss.

4. An optical assembly, comprising:

an etalon;

a lens;

a fiber;

a first optical path segment coupling the etalon and the lens, wherein the length of the first optical path segment is selected to achieve a predetermined minimum insertion loss; and a second optical path segment coupling the lens and the fiber, wherein the length of the second optical path segment is selected to achieve a predetermined minimum insertion loss ripple.

5. An optical assembly, comprising:

an etalon;

a lens;

a fiber; and an optical path coupling the etalon, the lens and the fiber, wherein the length of a segment of the optical path between the lens and the fiber is selected to achieve a predetermined minimum insertion loss ripple.

6. The assembly of claim 5, wherein the length of a segment of the optical path between the etalon and the lens is selected to achieve a predetermined minimum insertion loss.

* * * * *